UNITED STATES PATENT OFFICE.

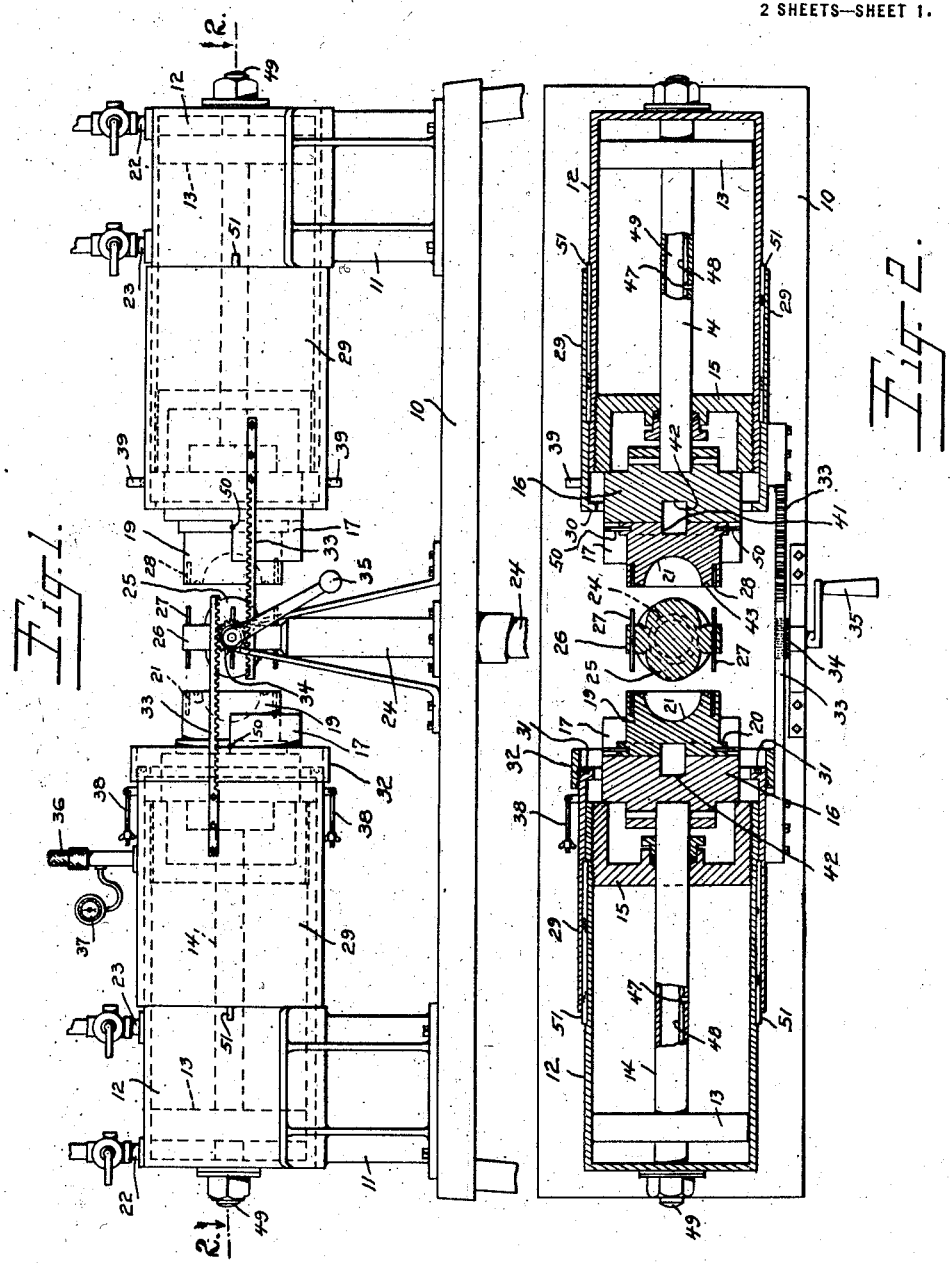

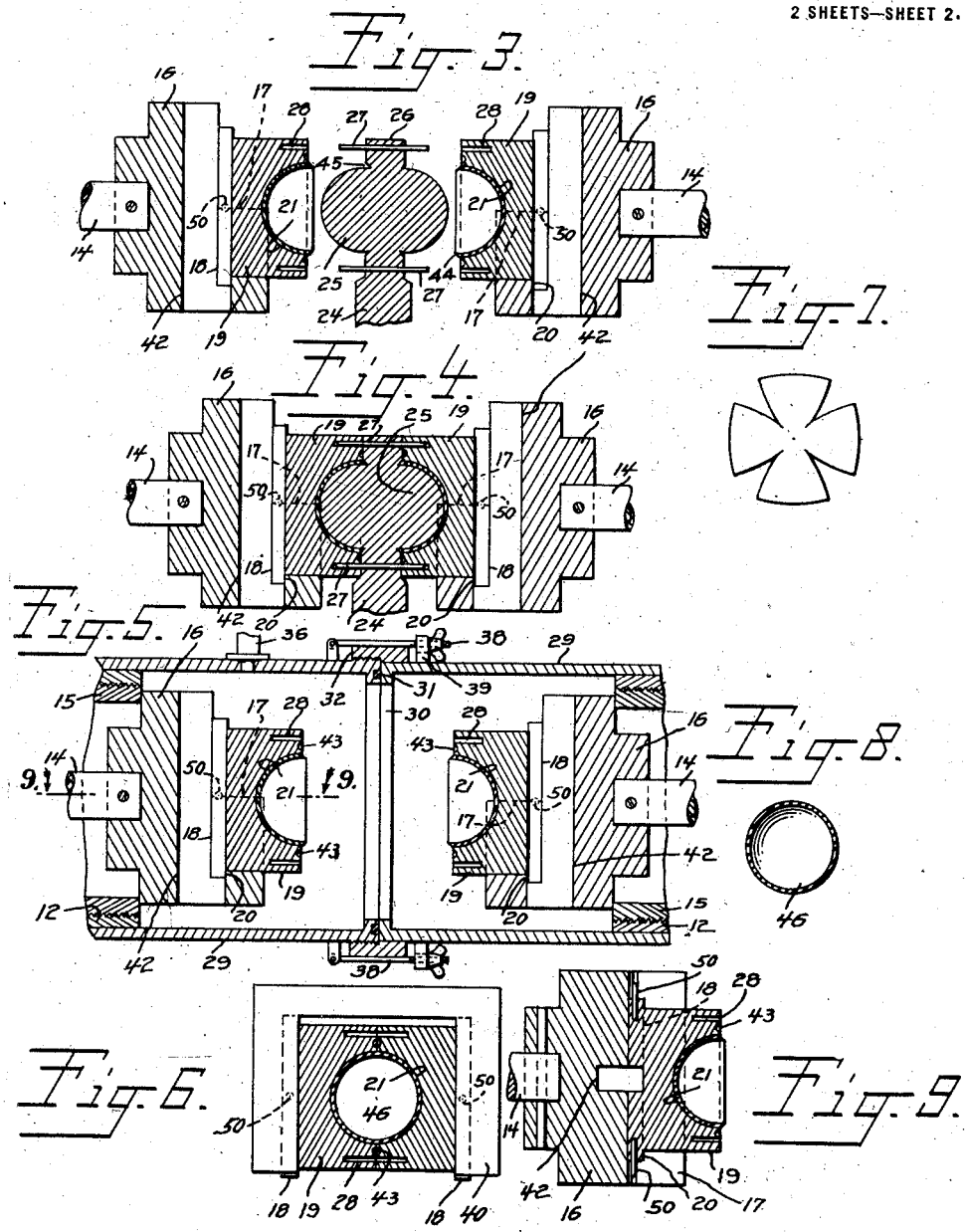

NEIL D. CRAWFORD, OF MILFORD, CONNECTICUT, ASSIGNOR TO THE MECHANICAL RUBBER COMPANY, A CORPORATION OF NEW JERSEY.

METHOD AND APPARATUS FOR MANUFACTURING INFLATED RUBBER ARTICLES.

1,365,462. Specification of Letters Patent. Patented Jan. 11, 1921.

Application filed September 22, 1920. Serial No. 411,882.

*To all whom it may concern:*

Be it known that I, NEIL D. CRAWFORD, a citizen of the United States, residing in the city of Milford, county of New Haven, and State of Connecticut, have invented certain new and useful Improvements in Methods and Apparatus for Manufacturing Inflated Rubber Articles, of which the following is a full, clear, and exact description.

This invention relates to the manufacture of hollow rubber articles of that general class which have greater internal pressure than the atmospheric pressure upon the exterior. The invention relates particularly to the manufacture of tennis balls and similar articles which are formed in parts, the several parts being united while the article is being simultaneously inflated, and final formation being given to the inflated article by vulcanizing it in a mold.

This application is a continuation in part of my application Serial No. 53,191, filed September 29th, 1915.

The object of the invention is to produce an apparatus in which the shaping, uniting, and inflating operations may be accomplished quicker than hitherto and more efficiently. This end I attain by the provision of simple mechanism for simultaneously shaping the parts of the article, and for then simultaneously uniting the parts and inflating the article. The device is so constructed that the movement of the parts carrying the rubber stock is toward and away from each other during all the various operations performed, and said parts are used continuously without transferring the stock therefrom during any stage of the process.

For a detailed description of one form of my invention reference may be had to the following specification and to the accompanying drawing, in which—

Figure 1 is a side elevation of the apparatus;

Fig. 2 is a sectional view on the line 2—2, Fig. 1;

Fig. 3 is an enlarged sectional view showing the sections of the mold about to be closed upon the core to form the halves of the rubber article therebetween;

Fig. 4 is a sectional view similar to Fig. 3 and showing the sections of the mold closed upon the core;

Fig. 5 is a sectional view showing the pressure chamber for inflating the article during closing of the molds after removal of the core;

Fig. 6 is a sectional view showing the mold sections clamped and ready for the vulcanizer;

Fig. 7 is a plan view of the blank from which one half of the article is formed;

Fig. 8 is a sectional view through the finished article;

Fig. 9 is a cross-sectional view on the line 9—9, Fig. 5.

Referring now to the drawings in which like characters of reference designate similar parts, 10 designates a support from which rise standards 11 that support opposed cylinders 12 which are disposed horizontally in axial alinement. Within each cylinder is a piston 13 the rod 14 of which projects through the head 15 of the cylinder and is terminally equipped with a holder 16, and further is made hollow at its opposite or inner end and provided with a pin 47 which projects in a slot 48 of a pin 49 secured to the end of the cylinder 12 to prevent rotation of the rod 14 and the parts carried thereby. Each holder is provided on the front face with a semi-cylindrical shoulder 17 having a groove 20 at its inner face at the juncture with the holder. Each holder removably supports a section 19 of a mold, the section being cylindrical in outline and bearing within the shoulder 17, and having a flange 18 at the inner end which is received within the groove 20 in the shoulder and anchors the section against withdrawal in any direction except vertically, pins 50 being provided in the flanges 18 and disposed to seat in corresponding grooves formed in the shoulder 17 to prevent the section 19 from rotating. Each mold section is formed with a hemispherical recess 21 in the front face, the recesses coöperating in forming a sphere when the sections are closed. The sections are moved in axial alinement toward or away from each other by the pistons 13 which are acted upon by compressed air or other medium under pressure admitted and released through valve controlled pipes 22 and 23.

Carried upon a vertical piston 24 between the mold sections 19 is a core 25 of such shape as to be received within the recesses 21 of the mold sections and conform to the curvature thereof. The core has a central flange 26 which projects between and separates the mold sections when the latter are moved inwardly upon the core to shape the parts of the article, as will be presently described. The flange carries dowels 27 which engage in corresponding openings 28 in the mold sections and position the core in axial alinement with the sections so that the product will be symmetrical. By means of the piston 24 the core may be withdrawn out of the path of movement of the mold sections to permit closing of the mold sections together to unite the parts of the article, as will be presently described.

Slidably fitted on each cylinder and secured against rotation by the feathers 51 is a casing 29 having an inwardly extending flange 30 on the front end. The flange of one of the casings carries a packing ring 31 whereby when the flanges are in abutting contact at the inner limit of movement of the casings a fluid tight joint will be produced. One casing is provided with a circumferential flange 32 which fits over the opposite casing and reinforces the joint when the casings are closed. After withdrawal of the core out of the path of movement of the casings, the casings may be moved inwardly to closed position by means of racks 33 engaging a pinion 34 which is rotated by a handle lever 35. When closed the casings form a chamber for a fluid under pressure which is supplied through a pipe 36 which carries a pressure indicator 37. To lock the casings closed pivoted clamp bolts 38 are mounted on one of the casings and engage in lugs 39 on the opposite casing.

For locking the mold sections together preparatory to placing the mold in the vulcanizer, a substantially U-shaped spring clamp 40 is placed astride of the sections, there being grooves 41 in the sections and mating grooves 42 in the holders to accommodate the legs of the clamp and promote applying the clamp to the mold section while they are still contained within the holders. The clamped mold sections may be withdrawn vertically from the holders, the grooves in the sections then operating to anchor the clamp against twisting and accidentally releasing the sections.

To produce tennis balls by this apparatus, rubber stock which has been reduced to the required gage on a calender, is cut into the form of a Maltese cross as shown in Fig. 7. The edges of the cross are brought together to produce a cup shaped member of raw rubber having substantially the required dimensions to fit nicely within the corresponding mold section and which subsequently forms one half of the ball. When both mold sections have been equipped with the cupshaped rubber halves of the ball, the pressure medium is admitted behind the pistons whereby the molds are moved toward and compress and shape the stock against the core 25 which has been previously brought into axial alinement with the mold sections. The surplus stock is squeezed into waste grooves 43 formed in the flat faces of the molds, the grooves being so shaped as to form cutting edges 44 which co-act with shear edges 45 on the core to cut off the waste stock from the shaped halves of the ball. The pressure behind the pistons is now released and pressure admitted in front of the pistons whereby the mold sections are moved outwardly carrying with them the shaped rubber halves, it being understood that the mold sections may be heated if desired to prevent displacement of the halves therefrom, but this is not essential since the weight of the halves coming upon the lower wall of the recesses 21 will of itself prevent displacement.

By means of the piston 24 the core is now lowered out of the path of movement of the casings 29, and the latter are moved inwardly to closed position by rotation of the crank handle 35 and are then locked closed. Compressed air or other desired medium under pressure is now admitted through the pipe 36 to the chamber formed by the casings, the pressure indicator 37 indicating the rising pressure so that the medium may be cut off at the desired point.

Next, pressure is again applied behind the pistons to move the mold sections inwardly into intimate contact with each other, and during such movement a quantity of the fluid under pressure in the chamber will be entrapped between the sections of the rubber article so that when the edges of said sections meet and are united by complete closing of the mold sections, the resultant spherical ball will be inflated and will have an internal pressure equal to the pressure within the chamber. Any surplus material is again squeezed out into the waste grooves 43 and cut off by the edges 44, thus producing a ball 46 which is devoid of seams or other inequalities in inner or outer contour.

The casings 29 are now unlocked and moved apart to facilitate insertion of the U shaped clamp 40 to clamp the mold sections together. The clamped mold is removed vertically from the holders 16 and transferred to a vulcanizer where vulcanization is given to the ball by any usual or preferred process.

Various modifications may be resorted to within the scope of the appended claims without departing from the spirit or sacrificing any of the advantages of the invention.

What is claimed is:

1. An apparatus for making inflated hollow articles comprising mold sections and a removable core between them for simultaneously shaping the component parts of the article, means for surrounding said mold sections with a fluid under pressure, after removal of the core, and means for actuating the mold sections to unite said component parts within the enveloping fluid under pressure.

2. An apparatus for making inflated hollow rubber articles comprising mold sections and a removable core between them for simultaneously shaping the component parts of the article, means for surrounding said mold sections with an enveloping fluid under pressure, after removal of the core, means for closing said mold sections to unite the component parts of the article within said enveloping fluid under pressure, and means for clamping the closed mold sections together.

3. An apparatus for making inflated hollow rubber articles comprising relatively movable mold sections, a removable core between the sections and coacting therewith in simultaneously shaping the component parts of the article, means for enveloping said mold sections in a fluid under pressure after removal of the core, means for moving said mold sections in axial alinement into closed position whereby the component parts of the article are united and a portion of the fluid under pressure entrapped in the article, and means for clamping the closed mold sections together.

4. An apparatus for making inflated hollow rubber articles comprising relatively movable mold sections, a removable core between the sections and coacting therewith in simultaneously shaping the component parts of the article, a casing for inclosing the mold sections and enveloping the same in a fluid under pressure, means for moving the mold sections in axial alinement into closed position for uniting the parts of the article while enveloped by said fluid under pressure, means for withdrawing the casing to expose the closed mold sections and means for clamping the closed mold sections together.

5. An apparatus for making inflated hollow rubber articles comprising opposed cylinders, pistons therein, holders carried by the pistons, mold sections removably secured to the holders, a removable core between the mold sections coacting therewith for simultaneously shaping the component parts of the article, means for moving the pistons to open and close the mold sections, means for enveloping the mold sections during their closing movement in a fluid under pressure, and means for clamping the closed mold sections together.

6. The method of manufacturing an inflated hollow rubber article with mold and core sections consisting in pressing the mold sections against the core section to form blanks into parts of an article, withdrawing the core section, bringing the mold sections together to unite the edges of the article parts while in air or gas under pressure, and subsequently vulcanizing the article.

7. The method of making inflated hollow rubber balls consisting in cutting cross-shaped blanks from sheet rubber, subjecting the interior and exterior surfaces of both blanks simultaneously to the pressure of rigid mold walls to form all the parts of the article with complementary joining edges, said parts being formed while maintaining them in oppositely disposed alined positions for uniting them, uniting the parts by bringing the complementary edges together while maintaining their alinement and while supported exteriorly by the mold walls and surrounded in a fluid under pressure, holding them in this position until said edges have adhered, transferring the ball to a vulcanizer, and finally vulcanizing the article while the pressure is maintained within it and the article is maintained within exterior rigid mold walls.

Signed at New Haven, Connecticut, this thirteenth day of August, 1920.

NEIL D. CRAWFORD.